(12) United States Patent
Nakata

(10) Patent No.: US 6,578,611 B2
(45) Date of Patent: *Jun. 17, 2003

(54) HEAVY DUTY PNEUMATIC RADIAL TIRE HAVING RADIUS OF CURVATURE AT SIDE REGIONS AND RADIUS OF CURVATURE AT CENTRAL PORTION

(75) Inventor: Hiroshi Nakata, Kodaira (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/499,356

(22) Filed: Feb. 8, 2000

(65) Prior Publication Data

US 2002/0166614 A1 Nov. 14, 2002

(30) Foreign Application Priority Data

Feb. 8, 1999 (JP) .......................................... 11-029527

(51) Int. Cl.⁷ .............................. B60C 3/00; B60C 9/20; B60C 11/00
(52) U.S. Cl. .................. 152/209.14; 152/454; 152/531; 152/535
(58) Field of Search ........................... 152/209.14, 454, 152/526, 535, 538, 531

(56) References Cited

U.S. PATENT DOCUMENTS

| | | | |
|---|---|---|---|
| 2,884,040 A | * 4/1959 | Boussu et al. ............... | 152/531 |
| 4,265,291 A | * 5/1981 | Pommier ..................... | 152/538 |
| 4,271,891 A | 6/1981 | Pommier | |
| 4,883,108 A | * 11/1989 | Takahashi et al. ........... | 152/538 |
| 5,553,646 A | * 9/1996 | Ando et al. ............. | 152/209.14 |
| 5,637,163 A | * 6/1997 | Kobayashi .................. | 152/538 |
| 5,647,925 A | * 7/1997 | Sumiya et al. ......... | 152/209.14 |
| 6,116,309 A | * 9/2000 | Gillard et al. ......... | 152/209.14 |

FOREIGN PATENT DOCUMENTS

| | | | |
|---|---|---|---|
| DE | 2343747 | * 3/1975 | ............ 152/209.14 |
| EP | 269301 | * 6/1998 | ............ 152/209.14 |
| JP | 62-295702 | * 12/1987 | ................. 152/454 |
| JP | 3-23361 | 3/1991 | |
| JP | 5-77608 | * 3/1993 | ............ 152/209.14 |
| JP | 7-25203 | * 1/1995 | |

OTHER PUBLICATIONS

Patent Abstracts of Japan, 07025203, vol. 1995, No. 04, Jan. 27, 1995.

Patent Abstracts of Japan, 04331606, vol. 017, No. 172, Nov. 19, 1992.

Patent Abstracts of Japan, 63184505 vol. 012, No. 459, Jul. 30, 1988.

* cited by examiner

Primary Examiner—Steven D. Maki
(74) Attorney, Agent, or Firm—Sughrue Mion, PLLC

(57) ABSTRACT

A heavy duty pneumatic radial tire comprises a carcass ply, a belt disposed at an outside of the carcass ply in the radial direction and comprised of two or more belt layers, at least one auxiliary belt layer disposed in a widthwise central portion of the belt at a width narrower than that of the belt, and a tread, wherein when the tire is mounted onto a design rim defined in TRA standard and inflated under an internal pressure corresponding to 10% of an air pressure defined in the TRA standard, a radius of curvature of an outer profile at both side regions of the tread (Rs) is made larger than a radius of curvature of the outer profile at a central region of the tread (Rc).

5 Claims, 1 Drawing Sheet

HEAVY DUTY PNEUMATIC RADIAL TIRE HAVING RADIUS OF CURVATURE AT SIDE REGIONS AND RADIUS OF CURVATURE AT CENTRAL PORTION

BACKGROUND OF THE INVENTION

1. Field of the Invention

This invention relates to a heavy duty pneumatic radial tire for use in a construction vehicle or the like.

2. Description of Related Art

In general, the pneumatic radial tire mounted onto a construction vehicle or the like is frequently run on a bad road, rough road and the like scattering rocks and ground stone pieces thereon under a heavy load, so that cracking is caused at a widthwise end of a belt layer and is apt to grow into separation failure.

In order to suppress such a separation failure at the belt end, there has hitherto been proposed a radial tire comprising an auxiliary belt layer disposed between a belt layer and a carcass ply at a width narrower than that of the belt layer and an inclination cord angle smaller than that of the belt layer with respect to a tread center as disclosed in JP-B-3-23361. In this tire, a greater part of tension in a circumferential direction at an inflation of an internal pressure and under loading is born by the auxiliary belt layer, whereby the diameter growth of the tire is controlled while increasing the inclination cord angle in the belt layer to suppress the separation failure at the belt end.

However, when the auxiliary belt layer is disposed between the belt layer and the carcass ply, the rigidity at the central portion of the tread becomes fairly high and the rigidity at a shoulder portion relatively lowers, and hence the bending deformation of the shoulder portion is increased in the running under loading. Thus, when the radius of curvature of the outer profile of the tread in the tire is constant over a full region of the tread, the ground contact form under loading becomes ununiform or the ground contact length in the central portion of the tread is restricted, while the ground contact length in the shoulder portion increases. As a result, the wear resistance of the tire lower but also the heat generation quantity in both the shoulder portions increases, so that there is a problem that it is apt to cause separation failure at a belt end through heat.

SUMMARY OF THE INVENTION

It is, therefore, an object of the invention to provide a heavy duty pneumatic radial tire capable of easily improving the wear resistance and the resistance to separation at belt end.

According to the invention, there is the provision of in a heavy duty pneumatic radial tire comprising a carcass ply of substantially a toroidal shape containing a plurality of inextensible cords arranged side by side in a radial direction of the tire, a belt disposed at an outside of the carcass ply in the radial direction and comprised of two or more belt layers each containing a plurality of inextensible cords arranged at a given inclination cord angle with respect to a center S of a tread, at least one auxiliary belt layer disposed in a widthwise central portion of the belt at a width narrower than that of the belt and containing inextensible cords arranged at an inclination cord angle with respect to the tread center S smaller than that of the cord in the belt, and a tread arranged at an outside of the belt in the radial direction, an improvement wherein when the tire is mounted onto a design rim defined in TRA standard and inflated under an internal pressure corresponding to 10% of an air pressure defined in the TRA standard, a radius of curvature of an outer profile at both side regions of the tread (Rs) is made larger than a radius of curvature of the outer profile at a central region of the tread (Rc).

In the invention, the radius of curvature of the outer profile (Rs) at both side regions of the tread is made larger than that (Rc) at the central region of the tread, so that the outer profile at both the side regions approaches to a straight line and hence the bending deformation amount at the shoulder portion under loading is restricted to control the increase of the ground contact length to thereby provide substantially the uniform ground contact shape. As a result, the wear resistance of the tire is improved and also the heat generation quantity at both the shoulder portions is controlled to improve the resistance to separation at the belt end.

In order to effectively control the growth of the tire diameter, it is favorable that the width and inclination cord angle of the auxiliary belt layer are 0.2~0.6 times a width of the tread and more than 0° but not more than 15°, respectively.

And also, the above effects can be ensured when a boundary point K between each side region and the central region of the tread is located between an inner point P1 separated from the tread center S by 0.225 times a tread width T and an outer point P2 separated from the tread center S by 0.400 times the tread width T.

Furthermore, when the radius of curvature Rc of the outer profile in the central region is within a range of 1.8~5.5 times a section height Sh of the tire, it can be prevented that the bending deformation in the tread central portion (ground contact pressure) becomes excessively large or small, whereby the amount of bending deformation in the shoulder portion under loading can sufficiently be restricted.

Moreover, when the radius of curvature Rs of the outer profile in both the side regions is not less than 1.3 times the radius of curvature Rc of the outer profile in the central region, there can be prevented the increase of the wearing in the tread central portion.

In addition, when the auxiliary belt layer is arranged between the carcass ply and the belt, the resistance to separation at belt end can further be improved.

BRIEF DESCRIPTION OF THE DRAWING

The invention will be described with reference to the accompanying drawing, wherein.

DESCRIPTION OF PREFERRED EMBODIMENTS

Figure 1:
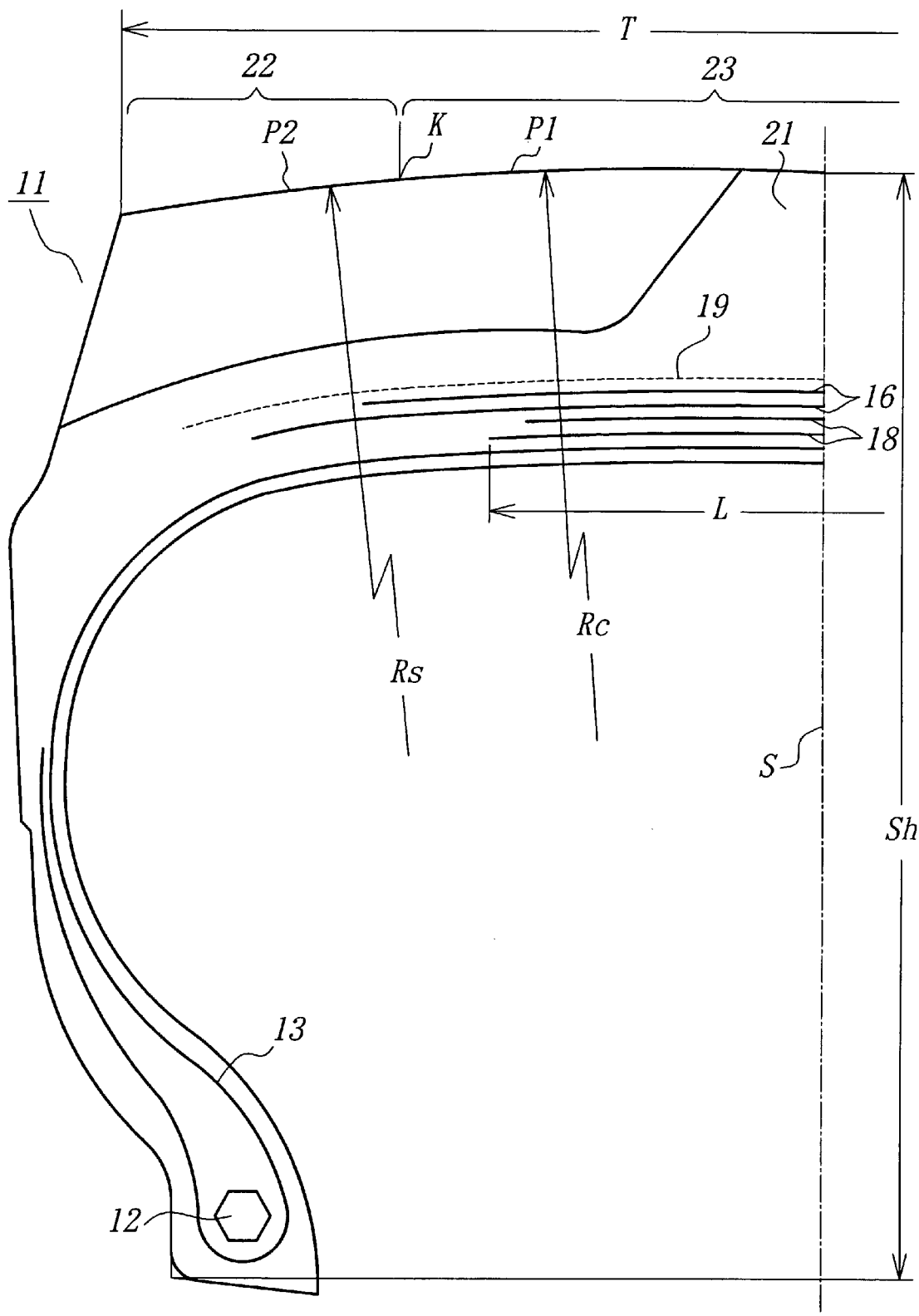
FIG. 1 is a diagrammatically left half section view of an embodiment of the radial tire according to the invention.

In FIG. 1 is shown an embodiment of the heavy duty pneumatic radial tire 11 to be mounted onto a construction vehicle or the like. The tire 11 comprises a pair of bead cores 12, and a carcass ply 13 toroidally extending between the bead cores 12. Each end portions of the carcass ply 13 is turned up around the bead cores 12 to form a turnup portion. In the inside of the carcass ply 13 are embedded a plurality of inextensible cords each extending in a radial direction (or meridional direction). The term "inextensible cord" used herein means a cord having an elongation at break (Eb) of 13% such as steel cord or the like.

Numeral 16 is a belt layer constituting a belt and disposed outward on the carcass ply 13 in the radial direction. The belt is comprised of two or more belt layers, two belt layer in the illustrated embodiment. In the inside of the belt layer are embedded a plurality of inextensible cords arranged in parallel to each other. In this case, the cords embedded in the belt layer are inclined at a cord angle of 15~25° with respect to the tread center S. The cords of the belt layers are inclined in opposite directions and crossed with each other between the two belt layers.

Numeral 18 is one or more auxiliary belt layer placed on a widthwise central portion of the belt layer 16, two auxiliary belt layers in the illustrated embodiment. The auxiliary belt layer 18 is arranged at the outside of the carcass ply 13 and at the inside of the belt layer 16 in the radial direction, or between the carcass ply 13 and the belt layer 16. Moreover, the auxiliary belt layers 18 may be arranged at the outside of the belt layer 16 in the radial direction. However, when they are arranged between the carcass ply 13 and the belt layer 16, the resistance to separation at belt end can be improved. In the inside of the auxiliary belt layer 18 are embedded a plurality of inextensible cords arranged in parallel to each other, wherein the inclination angle of these cords with respect to the tread center S is smaller than that in the belt layer 16. The inclination angle of the cord in the auxiliary belt layer 18 is favorable to be more than 0° but not more than 15°. When the inclination angle is within the above range, a greater part of tension in circumferential direction at the inflation of the internal pressure and under loading is born by the auxiliary belt layer 18, whereby the growth of the tire diameter can be controlled while increasing the inclination cord angle of the belt layer 16.

In order to control the tire diameter while maintaining the section of the tire at a desired shape, it is preferable that the inclining directions of the cords in the two auxiliary belt layers are opposite to each other and the cords of these auxiliary belt layers are crossed with each other. And also, the width L of the auxiliary belt layer 18 is narrower than that of the belt layer 16 and is favorable to be within a range of 0.2~0.6 times the tread width T. When the width L is less than 0.2 times the tread width T, the effect of controlling the growth of the tire diameter is insufficient, while when it exceeds 0.6 times, the rigidity of the tread portion as a whole becomes too high. Moreover, the cords to be embedded in the auxiliary belt layer 18 may be cords bending in form of wave at a small pitch and having an inclination cord angle of substantially zero with respect to the tread center S (extending substantially in the circumferential direction) instead of straightforward extending cords arranged at the same inclination angle with respect to the tread center S.

Numeral 19 is a belt protection layer arranged at the outside of the belt layer 16 in the radial direction. The width of the belt protection layer 19 is made wider than that of the belt layer 16 so as to cover the belt layer 16 and the auxiliary belt layer. In the inside of the belt protection layer 19 are embedded a plurality of extensible cords arranged in parallel to each other, whereby the cut resistance and resistance to cut-through of the belt layer 16 and the auxiliary belt layer 18 are improved. The term "extensible cord" used herein means a cord having an elongation at break (Eb) of 4~7%, such as a steel cord formed by gently twisting steel filaments.

Numeral 21 is a tread arranged at the outside of the belt layer in the radial direction. The tread 21 has such a structure that a radius of curvature Rs of an outer profile in both side regions 22 is made larger than a radius of curvature Rc of an outer profile in a central region 23 at a self-standing posture when the tire 11 is mounted onto a design rim defined according to TRA standard and inflated under an internal pressure to 10% of an air pressure defined according to TRA standard. Thus, the outer profile in both the side regions 22 of the tread 21 approaches to a straight line, so that the amount of the bending deformation in the shoulder portion under loading is restricted to control the increase of the ground contacting length, whereby there can be obtained substantially a uniform ground contacting shaped in the running under loading. As a result, the wear resistance of the tire 11 is improved and also the heat generation quantity in both the shoulder portions is restrained to improve the resistance to separation at belt end.

The term "design rim defined according to TRA standard" used herein means a design rim of an approved size defined in Year Book of The Tire and Rim Association Inc. in USA (i.e. TRA standard). And also, the air pressure defined according to TRA standard means an air pressure corresponding to a maximum load in an approved size ply-rating described in TRA (maximum load capacity).

Furthermore, it is favorable that a boundary point K between each side region 22 and the central region 23 of the tread 21 is located between an inner point P1 separated from the tread center S by 0.225 times the tread width T and an outer point P2 separated from the tread center S by 0.400 times the tread width T. When the boundary point K is located toward the side of the tread center S from the inner point P1, the rubber amount in the shoulder portion is increased and hence heat generation is apt to be caused in the shoulder portion. On the other hand, when the boundary point K is located toward the side of the tread end from the outer point P2, the width of both side regions wherein the outer profile is near to a straight line becomes narrow and hence the increase of the ground contacting length in the shoulder portion can not be controlled. When the boundary point K is within the above range, the improvement of the wear resistance and the resistance to separation at belt end can be ensured. In this case, it is favorable that the outer profiles of the side region 22 and the central region 23 are smoothly connected to each other in the boundary point K without forming a corner angle, or tangents of both the regions in the boundary point K are connected to each other at the same inclination. Moreover, when the boundary point K is located in a circumferential groove of the tread 21, both the above regions may be connected at a discontinuous state.

And also, the radius of curvature Rc of the outer profile in the central region 23 is favorable to be not less than 1.8 times a tire section height Sh. When the radius of curvature Rc is less than 1.8 times the tire section height Sh, the bending deformation in the tread central portion becomes excessively large to cancel the effect of controlling the growth of the tire diameter by the auxiliary belt layer 18 and it is difficult to develop the shape effect, while when it is not less than 1.8 times, the amount of the bending deformation in the shoulder portion under loading can sufficiently be controlled. On the other hand, when the radius of curvature Rc exceeds 5.5 times the tire section height Sh, the bending deformation in the tread central portion (ground contact pressure) becomes excessively small and a greater part of the load is born by the shoulder portion, so that the quantity of heat generation in the shoulder portion increases and also the wear resistance is degraded. From the above facts, the radius of curvature Rc is favorable to be within a range of 1.8~5.5 times the tire section height Sh.

Moreover, the radius of curvature Rs of the outer profile in both side regions 22 is favorable to be not less than 1.3 times the radius of curvature Rc of the outer profile in the central region 23. When the radius of curvature Rs is less than 1.3 times the radius of curvature Rc, the ground contacting shape of the tire 11 becomes round to increase the ground contact pressure of the tread central portion and hence the effect of controlling the growth of tire diameter by the auxiliary belt layer 18 is hardly developed to degrade the wear resistance and the resistance to separation. In this case, the upper limit on the radius of curvature Rs of the outer profile in both side regions 22 is infinite, or the outer profile in both side regions 22 may be straight (flat). If the curvature of the outer profile in both side regions 22 is reversed or the center of curvature is located at the outside of the outer profile in the radial direction, the ground contacting length of the shoulder portion becomes too long and hence the wear resistance and the resistance to separation at belt end are degraded in the shoulder portion.

The following examples are given in illustration of the invention and are not intended as limitations thereof.

There are provided a conventional tire and tires 1~14 to be tested. In this case, each tire has a tire size of ORR40.00R57, a tread width T of 970 mm and a tire section height Sh of 1060 mm. In the conventional tire and test tires 1~11, In the test tire 12, only one auxiliary belt layer containing cords embedded at an inclination cord angle of 9° upward to the left therein and having a width of 400 mm is arranged on the outside of the belt layer in the radial direction and the distance from the tread center S to the boundary point K is 0.70 times the tread width T. In the test tire 13, only one auxiliary belt layer containing cords embedded at an inclination cord angle of 7° upward to the right therein and having a width of 420 mm is arranged between the carcass ply and the belt layer and the distance from the tread center S to the boundary point K is 0.70 times the tread width T. In the test tire 14, a first auxiliary belt layer containing cords embedded at an inclination cord angle of 7° upward to the left therein and having a width of 500 mm and a second auxiliary belt layer containing cords embedded at an inclination cord angle of 10° upward to the right and having a width of 560 mm are arranged between the belt layer and the carcass ply, and a distance from a tread center S to a boundary point K is 0.49 times a tread width T.

Each of these tires is mounted onto a design rim defined in TRA standard (29.00/6.0×57) and inflated under an internal pressure corresponding to 10% of an air pressure defined in TRA standard (0.7 kg/cm$^2$). At this state are measured the radius of curvature Rs (mm) of the outer profile in both side regions and radius of curvature Rc (mm) of the outer profile in the central region to obtain results as shown in Table 1. And also, a ratio of radius of curvature Rc to tire section height Sh and a ratio of radius of curvature Rs to radius of curvature Rc are shown in Table 1. Moreover, the feature that the radius of curvature is infinite means that the outer profile is straight (flat).

Then, the tire is inflated under the air pressure defined in TRA standard (7 kgf/cm$^2$) and run on a test drum at a speed of 10 km/h under a load corresponding to 1.2 times a standard load defined in TRA standard (72 ton) until separation failure is caused at the belt end of the conventional tire. Thereafter, each tire is cut out to measure a crack length produced at the belt end. The measured value is represented by an index on the basis that the conventional tire is 100 as a resistance to separation, wherein the larger the index value, the better the property. Moreover, the term "resistance to separation" used herein means a resistance to separation at belt end. On the other hand, a remaining depth of the groove in the tread after the running of the tire is measured and represented by an index on the basis that the conventional tire is 100 as a wear resistance, wherein the larger the index value, the better the property. The results are also shown in

TABLE 1

|  | Conventional tire | Test tire | | | | | | | | | | | | | |
| --- | --- | --- | --- | --- | --- | --- | --- | --- | --- | --- | --- | --- | --- | --- | --- |
|  |  | 1 | 2 | 3 | 4 | 5 | 6 | 7 | 8 | 9 | 10 | 11 | 12 | 13 | 14 |
| Rc | 4500 | 1600 | 1800 | 1950 | 2700 | 4000 | 5980 | 5900 | 2700 | 2700 | 2700 | 2700 | 3000 | 3000 | 2200 |
| Rc/Sh | — | 1.51 | 1.70 | 1.84 | 2.55 | 3.77 | 5.08 | 5.57 | 2.55 | 2.55 | 2.55 | 2.55 | 2.83 | 2.83 | 2.08 |
| Rs | 4500 | 7000 | 7000 | 7000 | 7000 | 7000 | 7000 | 7000 | 3000 | 3400 | 3550 | 5000 | infinite | infinite | infinite |
| Rs/Rc | — | 4.38 | 3.89 | 3.59 | 2.59 | 1.75 | 1.30 | 1.19 | 1.11 | 1.28 | 1.31 | 1.85 | infinite | infinite | infinite |
| Resistance to separation | 100 | 110 | 125 | 195 | 220 | 250 | 190 | 140 | 145 | 155 | 160 | 180 | 190 | 160 | 250 |
| Wear resistance | 100 | 102 | 103 | 120 | 118 | 124 | 119 | 105 | 104 | 106 | 108 | 116 | 105 | 107 | 110 |

As seen from the results of Table 1, when the radius of curvature Rs is made larger than the radius of curvature Rc, the resistance to separation at belt end and the wear resistance can be improved. Particularly, when the radius of curvature Rc is within a range of 1.8~5.5 times the tire section height Sh and the radius of curvature Rs is not less than 1.3 times the radius of curvature Rc, the resistance to separation at belt end and the wear resistance can surely be more improved. Moreover, the term "standard load" used herein means a maximum load (maximum load capacity) in an approved size ply-rating described in TRA.

As mentioned above, according to the invention, the wear resistance and resistance to separation at belt end can easily be improved.

What is claimed is:

1. A heavy duty pneumatic radial tire, comprising:
   a carcass ply of substantially a toroidal shape containing a plurality of inextensible cords arranged side by side in a radial direction of the tire,
   a belt disposed at an outside of the carcass ply in the radial direction and comprised of two or more belt layers each containing a plurality of inextensible cords arranged at a given inclination cord angle with respect to a center of a tread,
   at least one auxiliary belt layer disposed in a widthwise central portion of the belt at a width narrower than that of the belt and containing inextensible cords arranged at an inclination cord angle with respect to the tread center smaller than that of the cords in the belt, and
   a tread arranged at an outside of the belt in the radial direction, wherein when the tire is mounted onto a design rim defined in TRA standard and inflated under an internal pressure corresponding to 10% of an air pressure defined in the TRA standard, a radius of curvature of an outer profile at both side regions of the tread (Rs) is not less than 2.59 times a radius of curvature of the outer profile at a central region of the tread (Rc), wherein the radius of curvature Rc of the outer profile in the central region is within a range of 1.8~5.5 times a section height Sh of the tire.

2. A heavy duty pneumatic radial tire according to claim 1, wherein a boundary point K between each side region and the central region of the tread is located between an inner point P1 separated from the tread center S by 0.225 times a tread width T and an outer point P2 separated from the tread center S by 0.400 times the tread width T.

3. A heavy duty pneumatic radial tire according to claim 1, wherein the auxiliary belt layer has a width corresponding to 0.2~0.6 times a width of the tread.

4. A heavy duty pneumatic radial tire according to claim 1, wherein cords in the auxiliary belt layer have an inclination angle of more than 0° but not more than 15° with respect to the tread center.

5. A heavy duty pneumatic radial tire according to claim 1, wherein the auxiliary belt layer is arranged between the carcass ply and the belt layer.

* * * * *